UNITED STATES PATENT OFFICE.

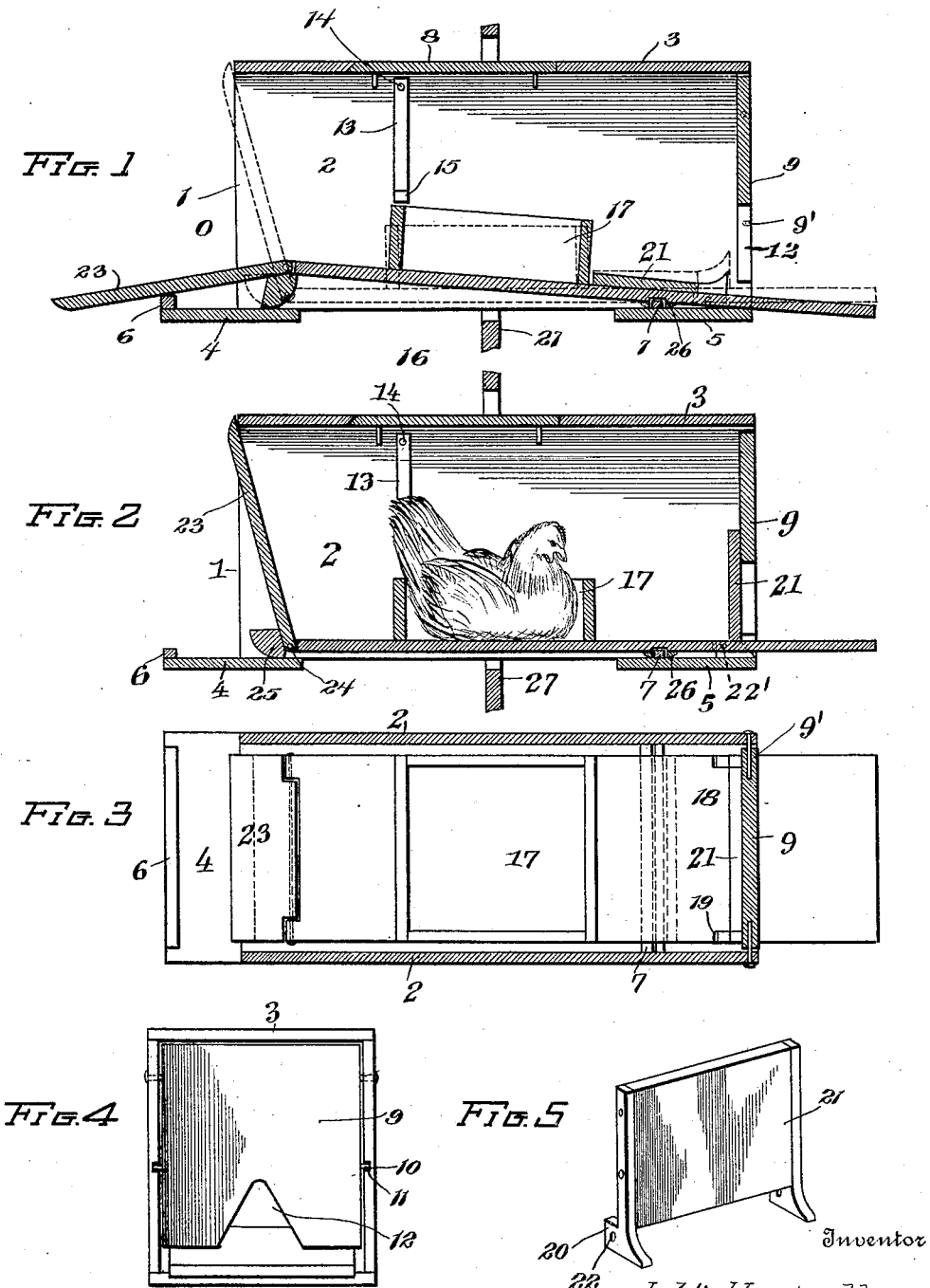

ISADORE W. HARTZELL, OF ROCK GLEN, PENNSYLVANIA.

AUTOMATIC TRAP CHICKEN-NEST.

1,051,952.  Specification of Letters Patent.  Patented Feb. 4, 1913.

Application filed February 3, 1912. Serial No. 675,145.

*To all whom it may concern:*

Be it known that I, ISADORE W. HARTZELL, a citizen of the United States, residing at Rock Glen, in the county of Luzerne and State of Pennsylvania, have invented new and useful Improvements in Automatic Trap Chicken-Nests, of which the following is a specification.

The present invention relates to certain novel improvements in trap nests for fowls.

In carrying out my invention it is my purpose to provide a trap nest which is of an extremely simple construction, which embodies new parts, which may be easily cleaned, which will effectively trap a hen after she has entered the nest, but which will readily permit of her exit through a swinging door which is arranged directly opposite the trap door which affords an entrance to the nest.

I further aim to provide a trap nest which embodies a housing and a removable bottom, the said bottom supporting the nest as well as carrying a hinged drop door for the housing, the housing being provided with a swinging door having a light opening which is arranged directly opposite the trap door of the nest, and which will readily open by a pressure by the hen when the latter desires to make her exit from the nest.

I further aim to provide a trap nest having means whereby a hen will be securely locked within the nest the said nest being formed with a suitable opening having a closure whereby the hen may be removed from the nest for any desired purpose.

It is, however, the primary object of the invention to provide an automatic trap nest which is adapted to be arranged between two yards or runs, one of the said yards adapted to contain the hens while within the second yard is kept the male bird, so that the said nest forms a passage between the said yards for a purpose readily understood and also whereby the owner of the flock can readily distinguish the laying hens from the non-laying hens.

With the above recited objects and others of a similar nature in view the invention resides in the construction, combination and operative arrangement of parts hereinafter set forth in and falling within the scope of the appended claims.

In the drawings, Figure 1 is a vertical longitudinal sectional view taken through a nest constructed in accordance with the present invention, the trap door being shown in its lowered position. Fig. 2 is a similar sectional view illustrating the hen in position within the nest, the trap door closed and also the auxiliary or drop door in a raised position to prevent the exit of the hen. Fig. 3 is a horizontal sectional view, the trap door being partially open and the auxiliary or drop door being in its lowered position. Fig. 4 is an end view of the nest looking toward the swinging door. Fig. 5 is a perspective view of the auxiliary or drop door.

Referring now to the drawings in detail the numeral 1 designates the housing of the device. This housing comprises a substantially rectangular boxing having side walls 2, a top 3 and bottom side connecting board or floors 4 and 5. The floor 4 projects a suitable distance beyond one of the open ends of the housing and has its extremity formed or otherwise provided with a transversely extending cleat 6. The floor 5 terminates at the opposite end of the housing and the said floor is provided with a transversely arranged bead 7. The top is provided with a suitable opening which is adapted to receive a removable closure 8, the purpose of which will presently be set forth. The rear end of the housing or that portion opposite to the floor 4 is provided with a pivoted door 9, the pivots 9' of the same being arranged adjacent the top 3, and the said door is provided with stops 10 which are adapted to be received within recesses 11 formed in the side members 2 of the housing to prevent the inward swinging of the door. The lower extremity of the door 9 is formed with a V-shaped depression or cut away portion 12, the latter adapted to serve as a light opening for the interior of the housing.

The numeral 13 designates a strip which is pivoted to one of the sides 3 as at 14 and which has its lower portion formed with an offset or lug 15, the purpose of this member will presently be set forth.

The numeral 16 designates the base for the nest. This base is of a width equaling or slightly lesser than the distance between the sides 3 of the housing, and attached to the said base is the nest 17. The base 16 has one of its ends projecting through the space provided below the pivoted door 9, as clearly illustrated in Figs. 1, 2 and 3 of the drawings, and the said base is further provided with notches or cutaway portions 18 and 19 which are adapted to serve for the reception of offset feet 20 provided upon an auxiliary or drop door 21. The feet 20 are provided with suitable openings 22, the same being for the reception of suitable pivot members 22' and whereby the door may be swung either to its lowered position illustrated in Fig. 1, or to an upward position as illustrated in Fig. 2. When the door is in the latter position it will be noted that it bears against the pivoted door 9, closing the light opening 12 thereof, and thus preventing the opening of the said door 9 by the fowl within the nest.

The numeral 23 designates the trap door for the nest. This trap door is hingedly connected as at 24 with the base 16, and the said door is provided upon its under face and adjacent its pivot with a rounded segmental fulcrum 25. The door is of a width equaling the base 16, and by reference to Fig. 1 of the drawings it will be noted that the lower face of the door normally rests upon the strip 6 and projects a suitable distance beyond the edge of the said strip and beyond the outer edge of the floor 4. The base, when the trap door is in its open position, is retained at an angle through the medium of the segmental fulcrum 25, and it will be noted that when a hen travels upon the inclined surface provided by the trap door and presses her weight upon the base 16 beyond the pivot 24, the fulcrum will be rotated to swing the door to the position illustrated in the full lines in Fig. 2, and to the position illustrated by the dotted lines in Fig. 1. The base 16 is provided with transversely arranged strips 26, and the space between the said strips is adapted to serve as a pocket for the reception of the bead 7. This bead, in conjunction with the strips 26 forms a pivot or fulcrum point for the base 16, but at the same time permits of the ready withdrawal of the base from the trap when desired. The offset or lug 15 of the member 13 is adapted to lie directly above and within the path of the swinging movement of the nest and is designed to limit the upwardly swinging movement of the said nest.

The nest is intended to be positioned between separate runs of a chicken yard and the numeral 27 designates the dividing fence or partition between the yards. We will assume that the parts are in the position illustrated in Fig. 1 of the drawings. When a hen, about to lay, enters the nest through the opening O of the housing, it will, as heretofore set forth, swing the trap door to its closed position. The nest is intended to be constructed of a size sufficient only to comfortably accommodate the hen, and the hen after laying and having her head toward the light opening 12 of the door 9 will leave the nest through the space provided by the opening, in doing this she will swing the door 9 upon its pivots and thus passing through the nest walks into the run opposite to that within which the opening O of the nest is positioned. In this second run are kept the male fowls and it will be noted that the laying hens are thus divided from the non-laying hens, so that the owner of the farm is in a position to determine just which hens are of value in laying. If the entrance provided by the nest, between the two runs is to be closed, the auxiliary or drop door 21 is swung upwardly to the position illustrated in Fig. 2. Furthermore, if for any desired reasons a hen is to be removed from the nest, as for instance when a hen desires to set, the said trap door is retained in the same position, and access to the hen may be obtained by the removal of the closure 8 from the top 3 of the housing.

From the above description taken in connection with the accompanying drawings the simplicity as well as the manifold advantages of the device will, it is thought be perfectly apparent to those skilled in the art to which such inventions appertain without further detailed description. It may be added however, that by providing the removable nest and trap door therefor, access to the interior of the housing may be readily obtained and both the nest and the housing can be thoroughly cleaned, so that the nest may be considered vermin proof.

Having thus described the invention what I claim is:—

1. A trap nest including a substantially rectangular housing having open ends, one of the ends of the housing being provided with a swinging door which is pivoted adjacent the top of the said housing, means for preventing the door swinging within the housing, the said door being formed with a light opening, the top of the housing being provided with a door, the bottom of the housing being provided with floors arranged adjacent the ends of the housing, one of said floors having its extremity provided with a transverse cleat, the second floor being provided with a bead, a base within the housing and projecting through the same below the pivoted door, the said base being provided with a pocket which is adapted to receive the bead of one of the sections of the floor of the housing, the opposite end of the base being arranged within the housing and adjacent the second floor of the housing, a pivoted trap door connected with this end of the base and normally lying upon the transverse strip at this end of the housing, a rounded fulcrum member carried by the door and contacting with the said section of the floor, and a nest upon the base.

2. A trap nest including a substantially rectangular housing having open ends, one of the ends of the housing being provided with a swinging door which is pivoted adjacent the top of the said housing, means for preventing the door swinging within the housing, the said door being formed with a light opening, the top of the housing being provided with a door, the bottom of the housing being provided with floors arranged adjacent the ends of the housing, one of said floors having its extremity provided with a transverse cleat, the second floor being provided with a bead, a base within the housing and projecting through the same below the pivoted door, the said base being provided with a pocket which is adapted to receive the bead of one of the sections of the floor of the housing, the opposite end of the base being arranged within the housing and adjacent the second floor of the housing, a pivoted trap door connected with this end of the base and normally lying upon the transverse strip at this end of the housing, a rounded fulcrum member carried by the door and contacting with the said section of the floor, a nest upon the base and an auxiliary door provided with extending feet which are pivotally connected with the base to permit of the said door being swung against the pivoted door of the housing substantially as and for the purpose set forth.

In testimony whereof I affix my signature in presence of two witnesses.

ISADORE W. HARTZELL.

Witnesses:
JOHN E. HARTRANFT,
JACOB LYNN, Jr.

---

Copies of this patent may be obtained for five cents each, by addressing the "Commissioner of Patents, Washington, D. C."